(No Model.)

H. FAIRBANKS.
INDICATOR FOR WEIGHING APPARATUS.

No. 387,285. Patented Aug. 7, 1888.

Witnesses.

Henry Fairbanks, Inventor.
By Atty

UNITED STATES PATENT OFFICE.

HENRY FAIRBANKS, OF ST. JOHNSBURY, VERMONT.

INDICATOR FOR WEIGHING APPARATUS.

SPECIFICATION forming part of Letters Patent No. 387,285, dated August 7, 1888.

Application filed July 19, 1886. Serial No. 208,379. (No model.)

*To all whom it may concern:*

Be it known that I, HENRY FAIRBANKS, of St. Johnsbury, in the county of Caledonia and State of Vermont, have invented a new Improvement in Indicators for Weighing Apparatus; and I do hereby declare the following, when taken in connection with accompanying drawings and the letters of reference marked thereon, to be a full, clear, and exact description of the same, and which said drawings constitute part of this specification, and represent, in—

Figure 1:
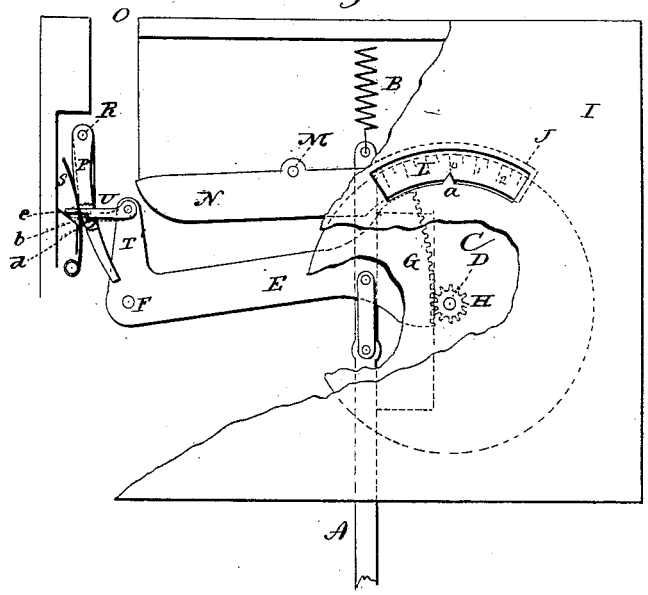
Figure 2:
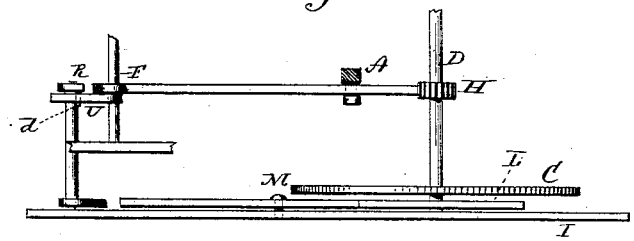

Figure 1, a front view of the indicating apparatus, portions of the plate broken away to show the mechanism; Fig. 2, a top view of the same, and Fig. 3 a detached view to illustrate the operation of the coin upon the mechanism.

This invention relates to an improvement in that class of apparatus designed to indicate weight or force or quantity—as, for illustration, weight of a person, force of a pull of a person, volume of breath from his lungs, and like purposes—and where a fixed charge is made for the use of the apparatus, as for weighing a person or indicating the force which he may produce by a pull or a push. Such apparatus is often used at fairs and other places in aid of charitable works, or for amusement or information of persons, the object of the invention being to construct an indicating device, in connection with the weighing apparatus, which will only indicate the weight or force upon the introduction to the apparatus of the coin required for the fixed charge; and it consists, principally, in a rotative disk in connection with the weighing apparatus, under force upon which apparatus the disk will be rotated according to the extent of weight or force applied, combined with a cover over said disk, and an aperture adapted to receive the requisite coin, the said cover extending to said aperture, and whereby the proper coin introduced will turn said cover from over the disk and expose the said disk at the indicating-point, as more fully hereinafter described.

A represents the steelyard-rod which comes up from the last lever, say, of a platform-scale. (Not shown.) This hangs, preferably, upon a spiral spring, B, and so that it moves up and down, according to the movement of the platform or whatever it may be to which the force or thing to be weighed is applied.

C is a graduated disk fixed to a shaft, D, and so as to revolve freely, and to which rotation is imparted through the rod A, as here represented, by means of a lever, E, hung upon a fulcrum, as at F, and extending toward the shaft of the disk, its free end constructed in the form of a segment-rack, G, to work into a corresponding pinion, H, on the shaft D of the disk, and so that as the weight or force is applied to the lever E the disk will be rotated accordingly, as in many common and well-known weighing apparatus. The disk is arranged in rear of a plate or front, I, of an inclosing case, in which is an opening, J, in front of the disk, segment-shaped, as seen in Fig. 1, and so that when open to the disk it will expose the circle of graduations on the disk, there being a point, *a*, arranged to indicate zero when the apparatus is in its normal condition.

L is one arm of a lever hung upon a fulcrum, M, the said arm L extending between the disk C and the plate I, and so that in its normal condition it will stand in rear of the opening and hide the graduations on the disk, as seen in Fig. 1. The other arm, N, of the lever extends in the opposite direction; but the arm L is of a weight to overbalance the arm N, and so that by gravity or its equivalent the arm L will normally stand as a cover for the opening J in the plate and so as to hide the disk.

In rear of the plate I and in the plane of the arm N is a vertical passage, O, of only sufficient extent to receive the requisite coin, and into one side of this opening the arm N of the lever extends and so as to form a stop in that opening. Upon the side of the passage opposite the lever N is a lever, P, hung upon a fulcrum, R. The side of this lever in the passage is a segment, of which the fulcrum M of the lever L N is the center, and so that the movement of the end of the arm N up and down will be parallel with the corresponding surface of the lever P, the lever P being in the same plane as the lever N. Upon the back of this lever P is a spring, S, adapted to bear the lever P up to its normal position, corresponding to the path of the lever N, but from which the lever P may be turned.

Figure 3:
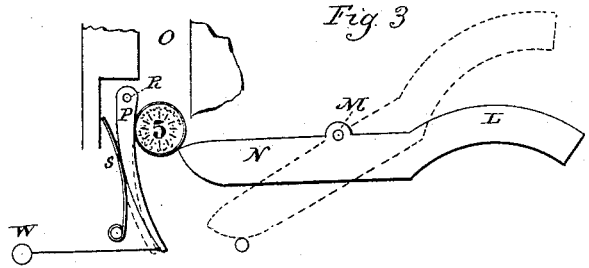

The distance between the end of the lever N and the corresponding side of the lever P is somewhat less than the diameter of the coin required to pay the charge for indicating the weight or force—say five cents—as indicated in Fig. 3, and so that the required nickel dropped through the passage O will strike the lever P upon one side and the end of the lever N upon the opposite side, as seen in Fig. 3. The weight of this coin is sufficient to counterbalance the longer or heavier arm, L, of the lever, and hence will turn the lever and raise the arm L to expose the disk, as indicated in Fig. 3. A lighter coin, however, will not have this effect.

A person having stepped upon the scale to be weighed, or otherwise applied the requisite force to the rod A, and placing the requisite coin through the passage O, the lever will be raised to indicate the weight or force which the person has so applied. Such force, however, cannot be discovered until the requisite coin has been dropped into the passage O to turn the lever from the opening to expose the disk, it being understood that the opening is protected by glass or otherwise (not shown) to prevent tampering with the lever or cover. The coin may turn the lever N so far as to pass into a receptacle below, (not shown,) and then the lever would of its own weight return; but as this might not give sufficient length of time for the examination of the disk, the descent of the arm N is arrested, say as seen in broken lines, Fig. 3, before it has descended so far as to permit the coin to escape between it and the lever P. The lever will therefore stand in that position until the coin has been discharged, and to automatically discharge the coin I provide the lever E with an arm, T, extending upward, and carrying a dog, U, the said dog having a shoulder, b, adapted to engage a stud, d, on the lever P when the lever E rises, the said shoulder escaping from the stud as the lever E descends; but when the lever E rises then the shoulder b on the dog will engage the stud d on the lever P, as indicated in broken lines, Fig. 1, and then in completing its forward movement the dog will turn the lever P away from the lever N, as indicated in broken lines, Fig. 3, sufficiently far to permit the coin to escape. Then, after this escape, the projecting end of the dog strikes a fixed incline, e, and so that in completing the upward movement of the lever E the extreme end of the dog will ride up this incline and turn it upward so far as to disengage the shoulder b from the stud d, and thereby permit the lever P to return under the action of its spring. Under this arrangement the opening of the disk will remain uncovered so long as the weight or force remains applied to the lever E; but under no circumstances can the disk be exposed until the requisite coin has been deposited.

The rack to operate the pinion H may be applied directly to the rod A, as indicated in broken lines, Fig. 1; but I prefer the lever as being a simple and effective device.

It is unnecessary to illustrate the scale or mechanism by which the weight or force is applied to the rod A, as it may be any of the known mechanism for such purpose, too well known to require illustration or description.

In case it be not desirable to make the escape of the coin through the mechanism which operates the disk, the lever P may be dispensed with and that side of the passage correspondingly shaped, so that the coin in descending will take with it the arm N. As an illustration of this modification, the inner surface of the lever P may be considered as the fixed side of the passage O; or, if the rest of the lever in the open position be desirable, this may be done mechanically instead of automatically, as described, say, as by applying to the lever a pull, W, to extend outside the case, as seen in Fig. 3, and by which the person in charge may at any desired time pull the lever P from its position of supporting the coin, and so that the coin may escape under this condition the lever may stand in the uncovering position for any desired time, whether or not the weight or force be in action.

I claim—

1. The combination of a disk adapted to be rotated under the force or weight applied to the apparatus, an inclosing-case, its front having an opening through it to expose the graduations on the disk, a passage adapted to receive a coin of certain size, a cover for said opening, and an obstruction in said passage in connection with said cover, substantially as described, and whereby the coin so introduced will strike the said obstruction, and by its weight remove the cover from said opening and expose the graduations on the disk.

2. The combination of the graduated disk C, a revolving shaft to which said disk is fixed, said shaft carrying a toothed pinion, H, a corresponding toothed rack, G, working into said pinion H and in connection with the weighing apparatus, a plate in front of said disk having an opening, J, adapted to expose the graduations of the disk, and a lever, one arm, L, of which extends between said disk and plate, so as to cover said opening, the other arm extending to the opposite side of the fulcrum, and the inclosing-case constructed with a coin-passage, through which a coin may be introduced, the said arm N of the lever extending into said coin-passage and in the path of a coin introduced therein, a lever, P, hung in the side of the coin-passage opposite the said arm N, and its inner surface of segment shape, of which the fulcrum of the said lever L N is the center, and mechanism, substantially such as described, to turn said lever P from said lever N, substantially as described.

3. The combination of the graduated disk C, arranged upon a shaft, D, carrying a toothed pinion, H, a plate in front of said disk constructed with an opening, J, adapted to expose the graduations on said disk, a lever, one arm of which extends between said plate and disk, and so as to serve as a cover for said opening, but adapted to be turned away from said opening to expose said disk, a coin-passage upon the side of the fulcrum opposite said opening to the disk, the other arm of said lever extending into said passage and in the path of a coin introduced, a lever, E, terminating at its free end in a toothed segment to work into the said pinion H and the said lever E, in connection with the weighing apparatus, a lever, P, hung in the side of the coin-passage opposite the end of the arm N therein, and a dog, U, hung upon said lever E and adapted to engage said lever P in the returning of the said lever E, substantially as and for the purpose described.

HENRY FAIRBANKS.

Witnesses:
DENNIS E. MAY,
E. A. WALKER.